US 7,454,320 B1

(12) United States Patent
James

(10) Patent No.: US 7,454,320 B1
(45) Date of Patent: Nov. 18, 2008

(54) SYSTEM AND METHOD FOR CALCULATING PARTIAL DIFFERENTIAL EQUATIONS IN A HARDWARE GRAPHICS PIPELINE

(75) Inventor: Gregory E. James, Redwood City, CA (US)

(73) Assignee: NVIDIA Corporation, Santa Clara, CA (US)

(*) Notice: Subject to any disclaimer, the term of this patent is extended or adjusted under 35 U.S.C. 154(b) by 1310 days.

(21) Appl. No.: 10/099,721

(22) Filed: Mar. 14, 2002

(51) Int. Cl.
*G06F 17/10* (2006.01)

(52) U.S. Cl. .......................... 703/2; 345/643; 345/644

(58) Field of Classification Search ................ 345/501, 345/502, 503, 506, 522, 643, 644; 703/2; 719/323, 324, 328
See application file for complete search history.

(56) References Cited

U.S. PATENT DOCUMENTS

| | | | | |
|---|---|---|---|---|
| 6,005,582 | A * | 12/1999 | Gabriel et al. | 345/586 |
| 6,078,938 | A * | 6/2000 | Pan et al. | 708/500 |
| 6,236,413 | B1 * | 5/2001 | Gossett et al. | 345/506 |
| 6,384,824 | B1 * | 5/2002 | Morgan et al. | 345/426 |
| 6,392,655 | B1 * | 5/2002 | Migdal et al. | 345/582 |
| 6,593,925 | B1 * | 7/2003 | Hakura et al. | 345/426 |
| 6,756,989 | B1 * | 6/2004 | Morgan et al. | 345/582 |
| 6,760,032 | B1 | 7/2004 | James | 345/506 |
| 6,765,584 | B1 * | 7/2004 | Wloka et al. | 345/584 |
| 6,876,361 | B2 * | 4/2005 | Venkataraman | 345/424 |
| 6,906,723 | B2 * | 6/2005 | Ault, Jr. | 345/582 |
| 2001/0028352 | A1 * | 10/2001 | Naegle et al. | 345/501 |
| 2002/0130865 | A1 * | 9/2002 | Venkataraman | 345/424 |
| 2002/0171672 | A1 * | 11/2002 | Lavelle et al. | 345/630 |
| 2002/0180741 | A1 * | 12/2002 | Fowler et al. | 345/520 |
| 2002/0190996 | A1 * | 12/2002 | Ault | 345/582 |
| 2003/0001851 | A1 * | 1/2003 | Bushey | 345/506 |
| 2003/0028568 | A1 * | 2/2003 | Peterson et al. | 708/313 |
| 2004/0125103 | A1 * | 7/2004 | Kaufman et al. | 345/419 |

OTHER PUBLICATIONS

Molnar et al., "PixelFlow: High-Speed Rendering Using Composition", ACM 1992.*
Roy, Promit, "*Direct3D* vs. *OpenGL*: Which API to use When, Where, and Why", www.GameDev.net, Feb. 24, 2002.*
Press, William H.; Flannery, Brian P.; Teukolsky, Saul A.; Vetterling, William T.; "Numerical Recipes in Fortran 77", 2001, Second edition, Cambridge University Press.*
Trendall, Chris; Stewart, A. James; "General Calculations using graphics hardware, with application to interactive caustics", Jun. 2000, "Rendering Techniques 2000: 11th Eurographics Workshop on Rendering".*
Roy-Chowdhury, Amber; Bellas, Nikolas; Banerjee, Prithviraj; "Algorithm-Based Error-Detection Schemes for Iterative Solution of Partial Differential Equations", 1996, IEEE Transactions on Computers, vol. 45, No. 4.*
Weiskopf, Daniel; Hopf, Matthias; Ertl, Thomas; "Hardware-Accelerated Visualization of Time-Varying 2D and 3D Vector Fields by Texture Advection via Programmable Per-Pixel Operations", 2001, Proceedings of the Vision Modeling and Visualization Conference.*

(Continued)

*Primary Examiner*—Paul L Rodriguez
*Assistant Examiner*—Russ Guill
(74) *Attorney, Agent, or Firm*—Zilka-Kotab, PC

(57) ABSTRACT

A system and method are provided for computing partial differential equations in a hardware graphics pipeline. Initially, input is received in a hardware graphics pipeline. Next, the input is processed to generate a solution to a partial differential equation utilizing the hardware graphics pipeline.

28 Claims, 16 Drawing Sheets

OTHER PUBLICATIONS

Press, William H.; Flannery, Brian P.; Teukolsky, Saul A.; Vetterling, William T.; "Numerical Recipes in C", 1988, Cambridge University Press.*

Lengyel, Jed; Reichert, Mark; Donald, Bruce R.; Greenberg, Donald P.; "Real-Time Robot Motion Planning Using Rasterizing Computer Graphics Hardware", 1990, Proceedings of the 17th annual conference on computer graphics and interactive techniques.*

Lindholm, Erik; Kilgard, Mark J.; Moreton, Henry; "A User-Programmable Vertex Engine", 2001, Proceedings of the 28th annual conference on computer graphics and interactive techniques.*

Ide, Nobuhiro et al.; "2.44 GFLOPS 300-MHz Floating-Point Vector-Processing Unit for High-Performance 3-D Graphics Computing", Jul. 2000, IEEE Journal of Solid-State Circuits, vol. 35, No. 7.*

Kedem, Gershon; Ishihara, Yuriko; "Brute force attack on UNIX passwords with SIMD computer", 1999, Proceedings of the 8th USENIX Security Symposium.*

Bohn, Christian-A; "Kohonen Feature Mapping through Graphics Hardware", 1998, 3rd International Conference on Computational Intelligence and Neurosciences.*

Harris, et al.; "Physically-Based Visual Simulation on Grpahics Hardware", Sep. 2002; Proceedings of the ACM SIGRAPH/Eurographics conference on Graphics Hardware.*

Ewins, Jon P.; Waller, Marcus D.; White, Martin; Lister, Paul F.; "MIP-Map Level Selection for Texture Mapping", 1998, IEEE Transactions on Visualization and Computer Graphics, vol. 4, No. 4.*

Rumpf, Martin and Strzodka, Robert; "Using Graphics Cards for Quantized FEM Computations"; Sep. 3-5, 2001, Proceedings of the IASTED International Conference on Visualization, Imaging and Image Processing.*

M. Rumpf and R. Strzodka; "Nonlinear Diffusion in Graphics Hardware",2001, Proceedings of EG/IEEE TCVG Symposium on Visualization.*

E. Galligani et al.; "Implementation of Splitting Methods for Solving Block Tridiagonal Linear Systems on Transputers", 1995, Proceedings of Euromicro Workshop on Parallel and Distributed Processing, pp. 409-415.*

Olav Beckmann et al.; "Data Distribution at Run-Time: Re-Using Execution Plans", 1998, Euro-Par'98, LNCS 1470, Springer-Verlag, pp. 413-421.*

Yulun Wang et al.; "A Processor Architecture for 3D Graphics", Sep. 1992, IEEE Computer Graphics & Applications, pp. 96-105.*

Andrew S. Tanenbaum; "Structured Computer Organization", second edition, 1984, Prentice-Hall, pp. 10-12.*

Y. Saad; "Krylov Subspace Methods for Solving Large Unsymmetric Linear Systems", Jul. 1981, Mathematics of Computation, vol. 37, No. 155, pp. 105-126.*

Richard L. Burden and J. Douglas Faires, "Numerical Analysis", fourth edition, 1989, PWS-Kent Publishing Company, pp. 383-393, 400-403 and 605-643.*

David Kincaid and Ward Cheney, "Numerical Analysis", 1991, Wadsworth Inc., pp. 161-164.*

U. Diewald, T. Preusser, M. Rumpf, R. Strzodka, "Diffusion models and their accelerated solution in image and surface processing", 2001, Acta Mathematica Universitatis Comenianae, vol. LXX, issue 1, pp. 15-31.*

J.L. Bell and G.S. Patterson Jr., "Data organization in large numerical computations", The Journal of Supercomputing, vol. 1, No. 1, pp. 105-136.*

E.S. Larsen et al., "Fast Matrix Multiplies using Graphics Hardware", Nov. 10, 2001, ACM/IEEE 2001 Conference on Supercomputing, six unnumbered pages.*

Jack Dongarra, "Stopping Criteria", 1995, two pages copied from the Internet at http://netlib.org/linalg/html_templates/node83.html.*

Jack Dongarra, "More Details about Stopping Criteria", 1995, four pages copied from the Internet at http://netlib.org/linalg/html_templates/node84.html#SECTION00921000000000000000.*

C.J. Thompson et al., "Using modern graphics architectures for general-purpose computing: a framework and analysis", Nov. 18, 2002, Proceedings of the 35th Annual IEEE/ACM International Symposium on Microarchitecture, twelve unnumbered pages.*

DeLoura, Mark A. "Gaming Programming Gems", Charles River Media, Inc. Rockland, Massachusetts, 2000.

Segal et al., "The OpenGL® Graphics System: A Specification (Version 1.3)", Aug. 14, 2001, Mountain View, CA.

* cited by examiner

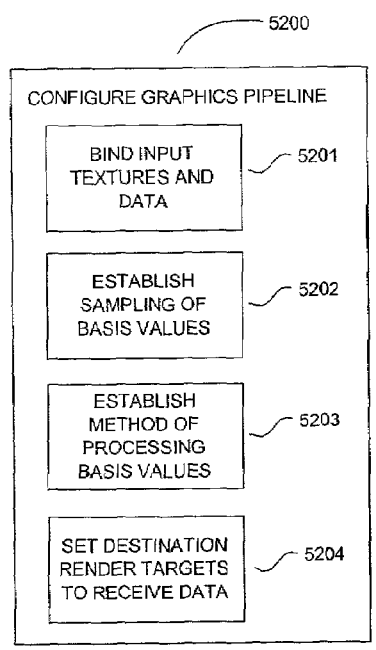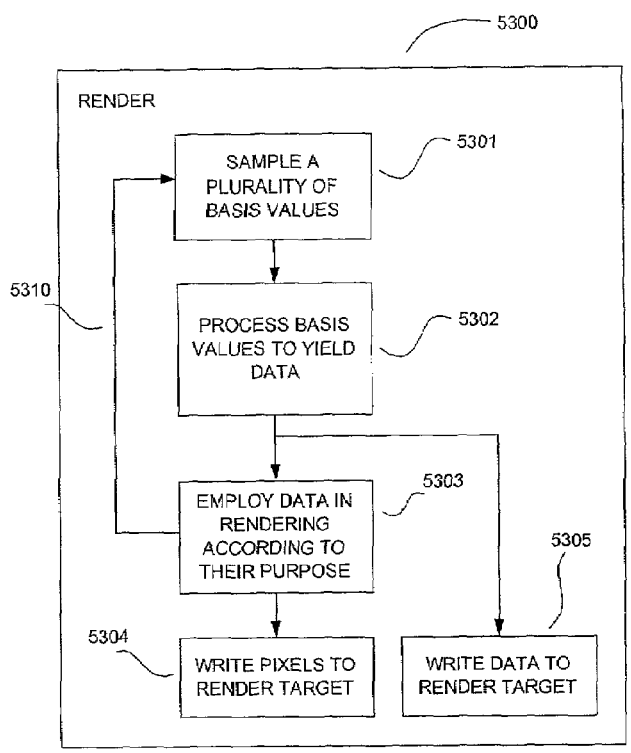
FIGURE 5B
FIGURE 5C
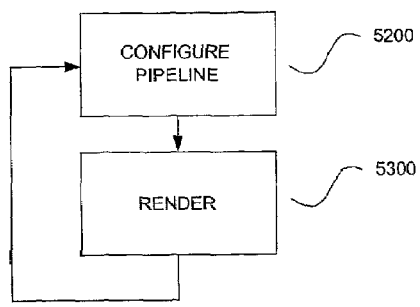
FIGURE 5D

1000

SYSTEM AND METHOD FOR CALCULATING PARTIAL DIFFERENTIAL EQUATIONS IN A HARDWARE GRAPHICS PIPELINE

FIELD OF THE INVENTION

The present invention relates to computer graphics, and more particularly, to calculating partial differential equations in a computer graphics processing pipeline.

BACKGROUND OF THE INVENTION

Three dimensional graphics are central to many applications. For example, computer aided design (CAD) has spurred growth in many industries where computer terminals, cursors, CRT's and graphics terminals are replacing pencil and paper, and computer disks and tapes are replacing drawing vaults. Most, if not all, of these industries have a great need to manipulate and display three-dimensional objects. This has lead to widespread interest and research into methods of modeling, rendering, and displaying three-dimensional objects on a computer screen or other display device. The amount of computations needed to realistically render and display a three-dimensional graphical object, however, remains quite large and true realistic display of three-dimensional objects have largely been limited to high end systems. There is, however, an ever-increasing need for inexpensive systems that can quickly and realistically render and display three dimensional objects.

One industry that has seen a tremendous amount of growth in the last few years is the computer game industry. The current generation of computer games is moving to three-dimensional graphics in an ever increasing fashion. At the same time, the speed of play is being driven faster and faster. This combination has fueled a genuine need for the rapid rendering of three-dimensional graphics in relatively inexpensive systems. In addition to gaming, this need is also fueled by e-Commerce applications, which demand increased multimedia capabilities.

Rendering and displaying three-dimensional graphics typically involves many calculations and computations. For example, to render a three dimensional object, a set of coordinate points or vertices that define the object to be rendered must be formed. Vertices can be joined to form polygons that define the surface of the object to be rendered and displayed. Once the vertices that define an object are formed, the vertices must be transformed from an object or model frame of reference to a world frame of reference and finally to two-dimensional coordinates that can be displayed on a flat display device. Along the way, vertices may be rotated, scaled, eliminated or clipped because they fall outside the viewable area, lit by various lighting schemes, colorized, and so forth. Thus the process of rendering and displaying a three-dimensional object can be computationally intensive and may involve a large number of vertices.

One specific operation that occurs in an application program in addition to rendering is the calculation of partial differential equations. For example, partial differential equations can be used to determine the location of objects or surfaces to be rendered. Such partial differential equations are traditionally calculated utilizing software and a central processor unit (CPU), since such calculations are generally not cost effective to be implemented in hardware. However, calculating partial differential equations in software places a heavy burden of computation on the system which may be a significant bottleneck in the application program, and can therefore impede the process of rendering. With the growing demand for higher performance graphics for computers, the need for speeding up the solution of partial differential equations becomes imperative.

There is thus a general need to increase the speed and efficiency of the various processing components, while minimizing costs. In general, consolidation is often employed to increase the speed of a system. Consolidation refers to the incorporation of different processing modules on a single integrated circuit. With such processing modules communicating in a microscopic semiconductor environment, as opposed to external buses, speed and efficiency may be vastly increased. Additional gain may be achieved by performing many operations in parallel, as is common in a hardware graphics pipeline.

Consolidation is often limited, however, by a cost of implementing and manufacturing multiple processing modules on a single chip. One reason for this increase in cost is that the required integrated circuit would be of a size that is too expensive to be feasible. Rather than add unique circuitry to handle a problem, it is advantageous to leverage and extend existing circuitry in novel ways to handle the problem.

SUMMARY OF THE INVENTION

A system and method are provided for computing partial differential equations in a hardware graphics pipeline. Initially, input is received in a hardware graphics pipeline. Next, the input is processed to generate a solution to a partial differential equation utilizing the hardware graphics pipeline.

In one embodiment, the input may represent boundary conditions. This may be accomplished by the input including textures or geometry. As an option, the geometry may include polygons, vertex data, points, and/or lines.

In another embodiment, the input may include a local area of textures. Such local area of textures may be generated by sampling a texture map. Further, the local area of textures may be filtered. This may be accomplished utilizing a plurality of programmable and/or non-programmable filters. Moreover, such filters may include a plurality of elements. Optionally, the local area of textures may be used to sample a texture map to generate a modified local area of textures.

In still another embodiment, the processing may include a relaxation operation. Such relaxation operation may be selected based on the particularities of the partial differential equation. Moreover, the processing may include a plurality of iterations of the relaxation operation. Such number of iterations of the relaxation operation may be reduced using a combination of restriction and prolongation operations. Further, such number of iterations of the relaxation operation may be calculated prior to the processing or via a real-time convergence technique.

In an embodiment using the real-time convergence technique, the processing may further include determining whether the solution has converged. It may be determined whether the solution has converged after each iteration of the relaxation operation. In the alternative, it may be determined whether the solution has converged after a predetermined number of multiple iterations of the relaxation operation.

As an option, it may be determined whether the solution has converged by calculating errors. Such errors may then be summed or evaluated by various techniques after which it may be concluded that the solution has converged if, for example, the sum of errors or the greatest error is less than a predetermined amount. If it is determined that the solution has converged, the processing may be repeated using an incremented parameter value of the equation, for example a time value.

BRIEF DESCRIPTION OF THE DRAWINGS

The foregoing and other aspects and advantages are better understood from the following detailed description of a preferred embodiment of the invention with reference to the drawings, in which:

FIGS. 5B-D illustrates various techniques associated with the multi-sampling aspect set forth in FIG. 5A.

DETAILED DESCRIPTION

Figure 1A:
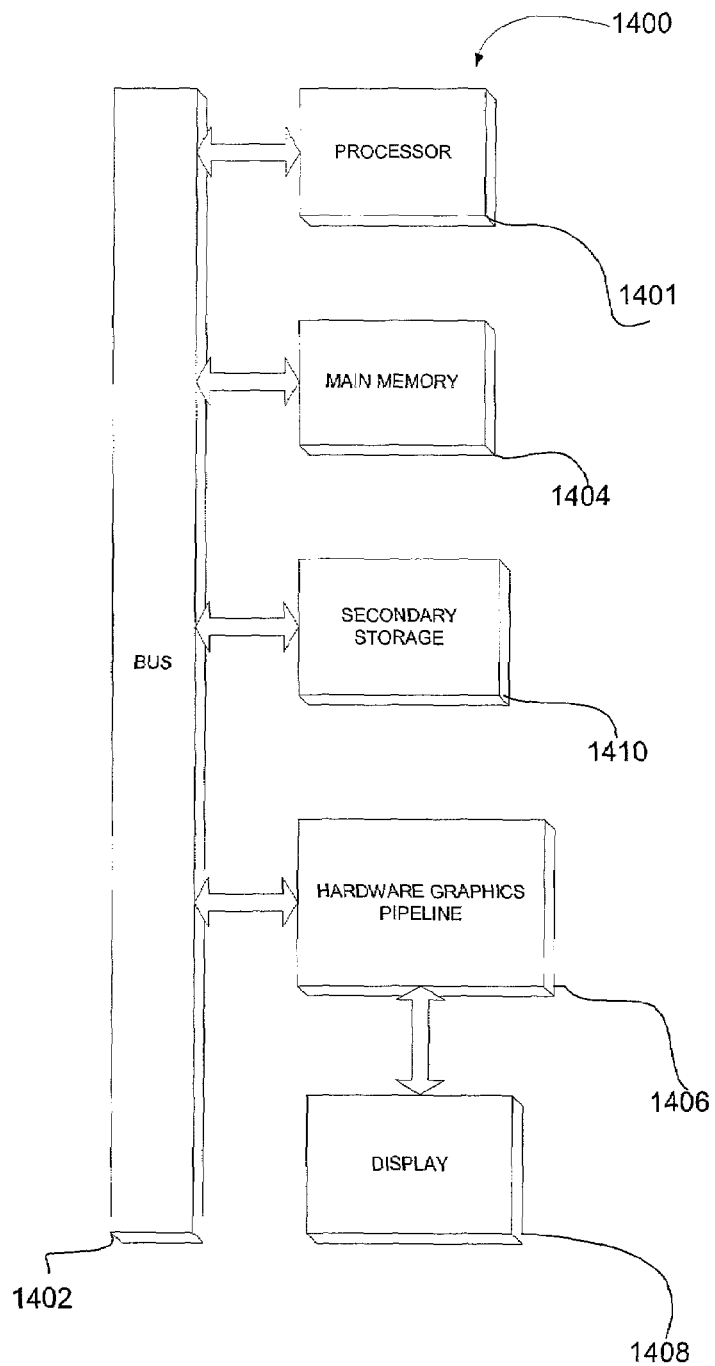
FIG. 1A is a block diagram of a digital processing system.

FIG. 1A is a block diagram of a digital processing system embodying the method and apparatus in accordance with one embodiment. With reference to FIG. 1A, a computer graphics system is provided that may be implemented using a computer 1400. The computer 1400 includes one or more processors, such as processor 1401, which is connected to a communication bus 1402. The computer 1400 also includes a main memory 1404. Control logic (software) and data are stored in the main memory 1404 which may take the form of random access memory (RAM). The computer also includes a hardware graphics pipeline 1406 and a display 1408, i.e. a computer monitor.

The computer 1400 may also include a secondary storage 1410. The secondary storage 1410 includes, for example, a hard disk drive and/or a removable storage drive, representing a floppy disk drive, a magnetic tape drive, a compact disk drive, etc. Computer programs, or computer control logic algorithms, are stored in the main memory 1404 and/or the secondary storage 1410. Such computer programs, when executed, enable the computer 1400 to perform various functions. Memory 1404 and storage 1410 are thus examples of computer-readable media.

In one embodiment, the techniques to be set forth are performed by the hardware graphics pipeline 1406 which may take the form of any type of hardware. Such hardware implementation may include a micro-controller or any other type of application specific integrated circuit (ASIC). More information on one exemplary embodiment of the hardware graphics pipeline 1406 will be set forth in greater detail during reference to FIG. 1B. The configuration of the graphics pipeline and general control over rendering operations is provided by the processor 1401 which may also prepare appropriate geometry and basis values.

Figure 1B:
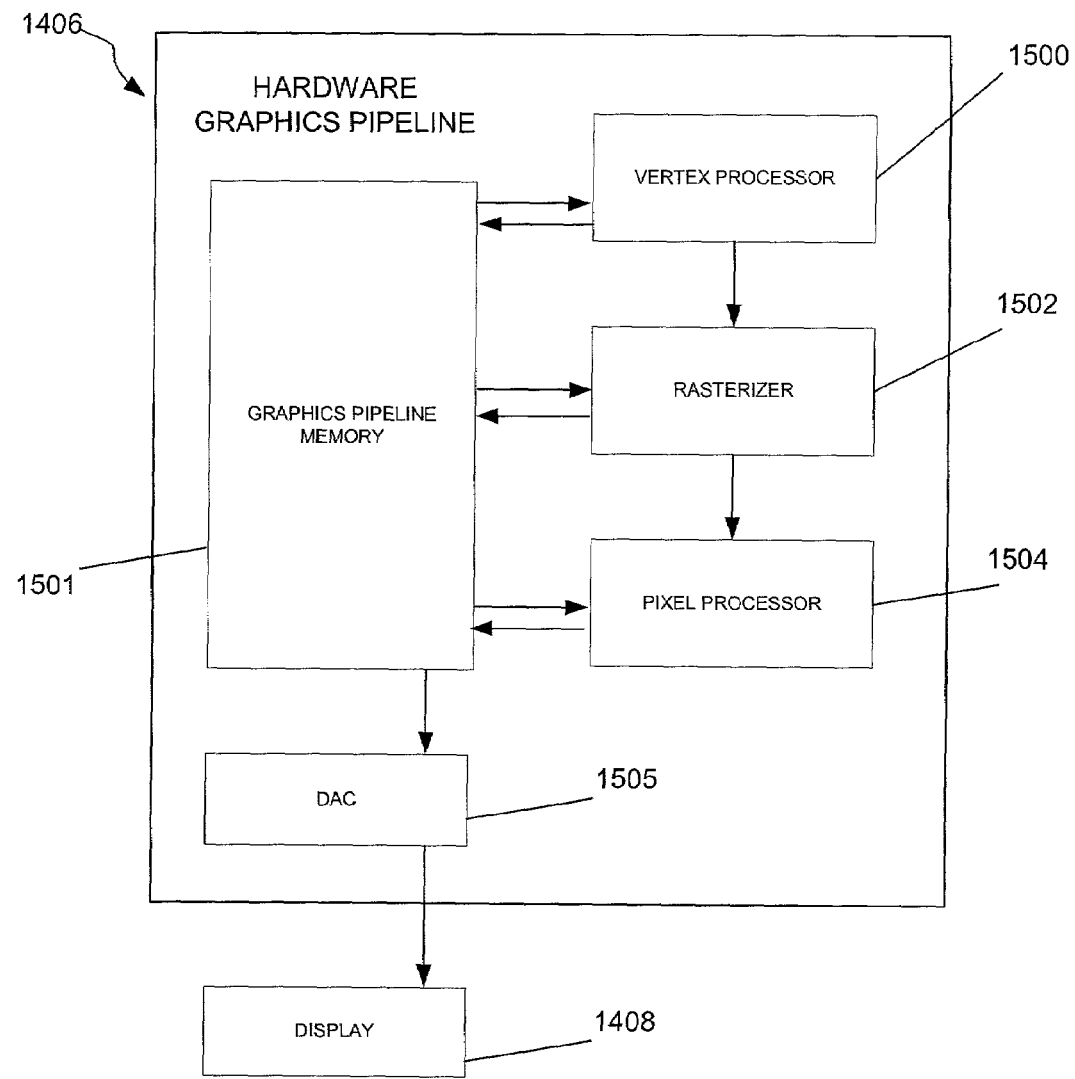
FIG. 1B illustrates the hardware graphics pipeline of FIG. 1A, in accordance with one embodiment.

FIG. 1B illustrates the hardware graphics pipeline 1406 of FIG. 1A, in accordance with one embodiment. As shown, the hardware graphics pipeline 1406 may include a vertex processor portion 1500 capable of performing various operations (i.e. transformation, lighting, etc.) on graphics data in the form of vertices in the hardware graphics pipeline 1406. Further included is a rasterizer 1502 coupled to the vertex processor portion 1500 for receiving the processed vertices therefrom. Such vertices define primitives. In the context of the present description, primitives may include, but are not limited to planar polygons. Alternate graphics primitives, for alternate embodiments, include: points, lines, quadratic patches, constructive solid geometry surfaces, and other higher order primitives. In use, the rasterizer 1502 converts the primitives to fragments that correspond to a pixel in a frame buffer render target. Further, a digital-to-analog converter (DAC) 1505 and pipeline memory 1501 may be incorporated in a well known manner.

Once rasterized, the fragments are processed by a pixel processor portion 1504 which is coupled to the rasterizer 1502. Despite the term "pixel processor" 1504, it should be noted that such portion processes texture fragments and/or pixels. Such processing may include, but is not limited to texturing, shading, texture coordinate perturbation, etc. More information on one exemplary embodiment of the pixel processor portion 1504 will be set forth in greater detail during reference to FIG. 1C.

Of course, any of the foregoing components of the hardware graphics pipeline 1406 may or may not be configurable in any desired fashion. Further, the various techniques to be described herein may be implemented in any one or more of the components of the hardware graphics pipeline 1406, per the desires of the user.

Figure 1C:
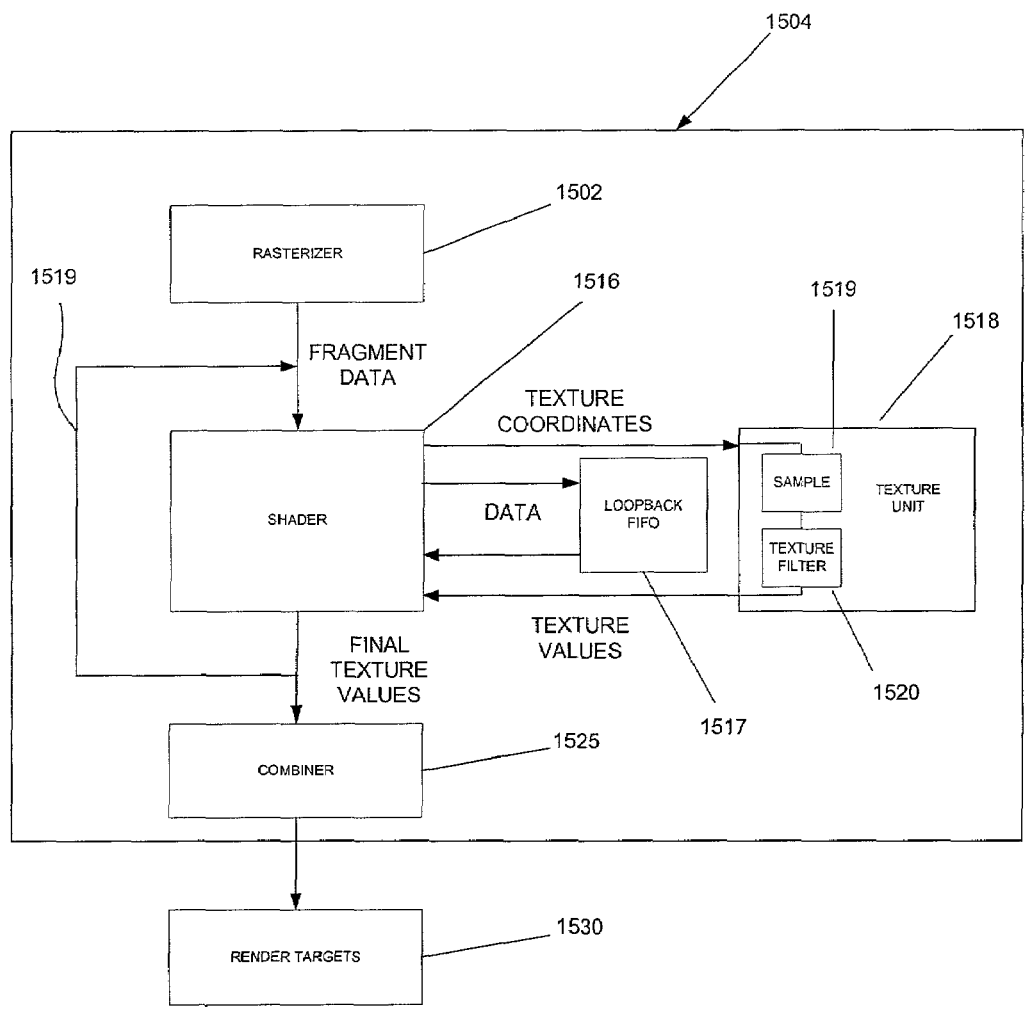
FIG. 1C shows an illustrative hardware implementation of the pixel processor portion of the hardware graphics pipeline of FIG. 1A, in accordance with one exemplary embodiment.

FIG. 1C shows an illustrative hardware implementation of the pixel processor portion 1504, in accordance with one exemplary embodiment. As shown, included is a shader module 1516 coupled to the rasterizer 1502, a texture fetch module 1518, and a combiner 1525 coupled to form a portion of the hardware graphics pipeline 1406. For reasons that will soon become apparent, a feedback loop 1519 is coupled between an output of the shader module 1516 and an input thereof. It should be noted that the rasterizer 1502 operates in a manner as set forth during reference to FIG. 1C. While the combiner 1525 may be implemented in any desired manner, one exemplary implementation is disclosed in a co-pending application issued under U.S. Pat. No. 6,333,744 and entitled "GRAPHICS PIPELINE INCLUDING COMBINER STAGES" filed Mar. 22, 1999 naming David B. Kirk, Matthew Papakipos, Shaun Ho, Walter Donovan, and Curtis Priem as inventors, and which is incorporated herein by reference in its entirety.

With continuing reference to FIG. 1C, the various inputs and outputs are shown for each of the components. The rasterizer 1502 generates fragment data (i.e. interpolated vertex data, edge distances, pixel depth) which are used by the shader module 1516 and texture fetch module 1518. Also shown is an optional feedback first-in first-out (FIFO) buffer. When the feedback loop 1519 is not utilized, the temporary data calculated internally by the present embodiment may be dropped before being sent to the texture fetch module 1518. As an option, data may be reused each time a particular group of pixels, or "quad," goes through the shader module 1516. If, for example, new vectors are generated during one pass, these vectors may continuously be associated with the quad on subsequent passes. Further, more than one fragment may be processed at a time while employing the feedback loop 1519.

A system and method may thus be provided for computing partial differential equations in the foregoing hardware graphics pipeline. Initially, input is received in the hardware graphics pipeline. Next, the input is processed to generate a solution to a partial differential equation utilizing the hardware graphics pipeline. More information regarding a specific implementation of such technique will be set forth during reference to the following figures.

Figure 2A:
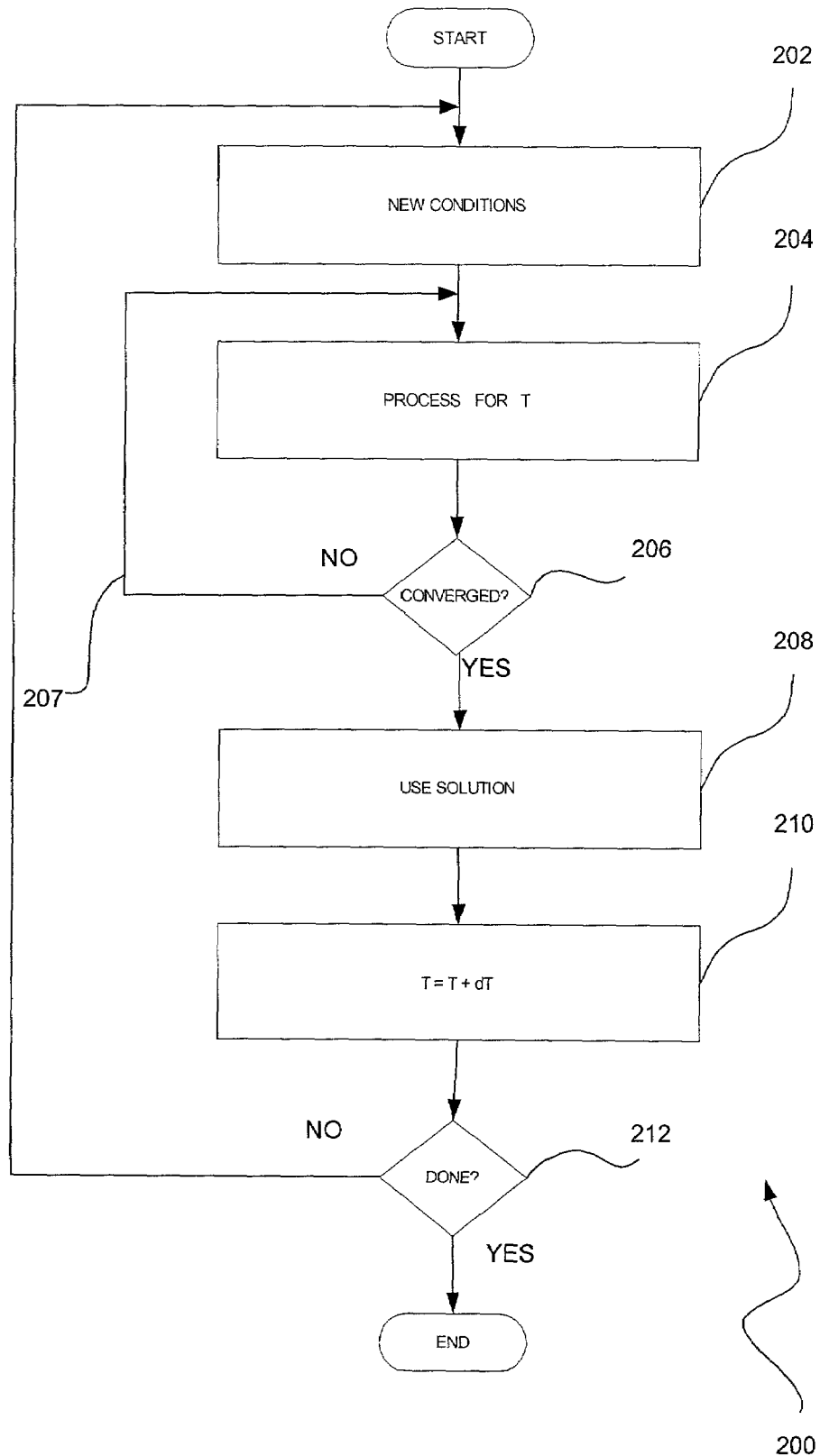
FIG. 2A illustrates a method for computing partial differential equations in a hardware graphics pipeline.

FIG. 2A illustrates a method 200 for computing partial differential equations in a hardware graphics pipeline. In one embodiment, the present method 200 may be carried out in the context of the architecture of at least one of FIGS. 1A-1C. Of course, the method 200 may be implemented in any desired architecture capable of carrying out the functionality set forth herein.

Initially, boundary conditions are received in operation 202. These boundary conditions may take the form of textures or geometry. As an option, the geometry may include polygons, vertex data, points, and/or lines. More information on the form of the input will be set forth in greater detail during reference to FIG. 3.

Next, a solution to a partial differential equation is calculated in operation 204 utilizing a relaxation operation involving the boundary conditions and the discrete grid of values representing the state of the equation. As an option, such relaxation operation may be selected based on the partial differential equation. In the context of the present description, a relaxation operation may include the filtering or smoothing of grid values. More information regarding an exemplary relaxation operation will be set forth during reference to FIGS. 4-6.

As an option, the boundary conditions may take the form of a local area of textures. Such local area of textures may be generated by sampling a texture map. Further, the local area of textures may be filtered. This may be accomplished utilizing a plurality of programmable and/or non-programmable filters. Moreover, such filters may include a plurality of elements. More information regarding an example of such filtering will be set forth hereinafter during reference to FIG. 7A. Optionally, the local area of textures may be used to sample a texture map to generate a modified local area of textures, as will described in greater detail in the context of an example during reference to FIG. 7B.

In use, the relaxation operation may be repeated during the course of multiple iterations. Such number of iterations of the relaxation operation may be calculated prior to the processing or via a real-time convergence technique. In the context of the present method 200, a convergence technique is utilized.

It is then determined, in decision 206, whether the solution has converged. If the solution has not converged, as determined by decision 206, the computing and determining operations (204 and 206, respectively) are repeated. See line 207. In an alternate embodiment, it may be determined whether the solution has converged after a predetermined number of multiple iterations of the relaxation operation, instead of after each iteration. If the solution has converged in decision 206, the solution may be utilized in operation 208. More information as to how it is determined whether a solution has converged will be set forth during reference to FIG. 2B.

As an option, the number of iterations of the relaxation operation may be reduced using a combination of restriction and prolongation operations. In the context of the present description, a restriction operation may include the mapping and filtering of grid values onto a grid of lower resolution, and a prolongation operation may include the mapping and filtering of grid values onto a grid of higher resolution.

Next, one or more parameters of the partial differential equation may be adjusted in operation 210. Such parameters may include a time value or any other suitable parameter of the equation. It may then be determined whether the present method is finished in decision 212. If so, the foregoing operations may be repeated using the incremented parameter values, as shown. If not, however, the present method 200 is terminated. At any step of the method, the state of the equation may be visualized by the user. Such visualization may be rapid and inexpensive as the state is held within the hardware graphics pipeline.

Figure 2B:
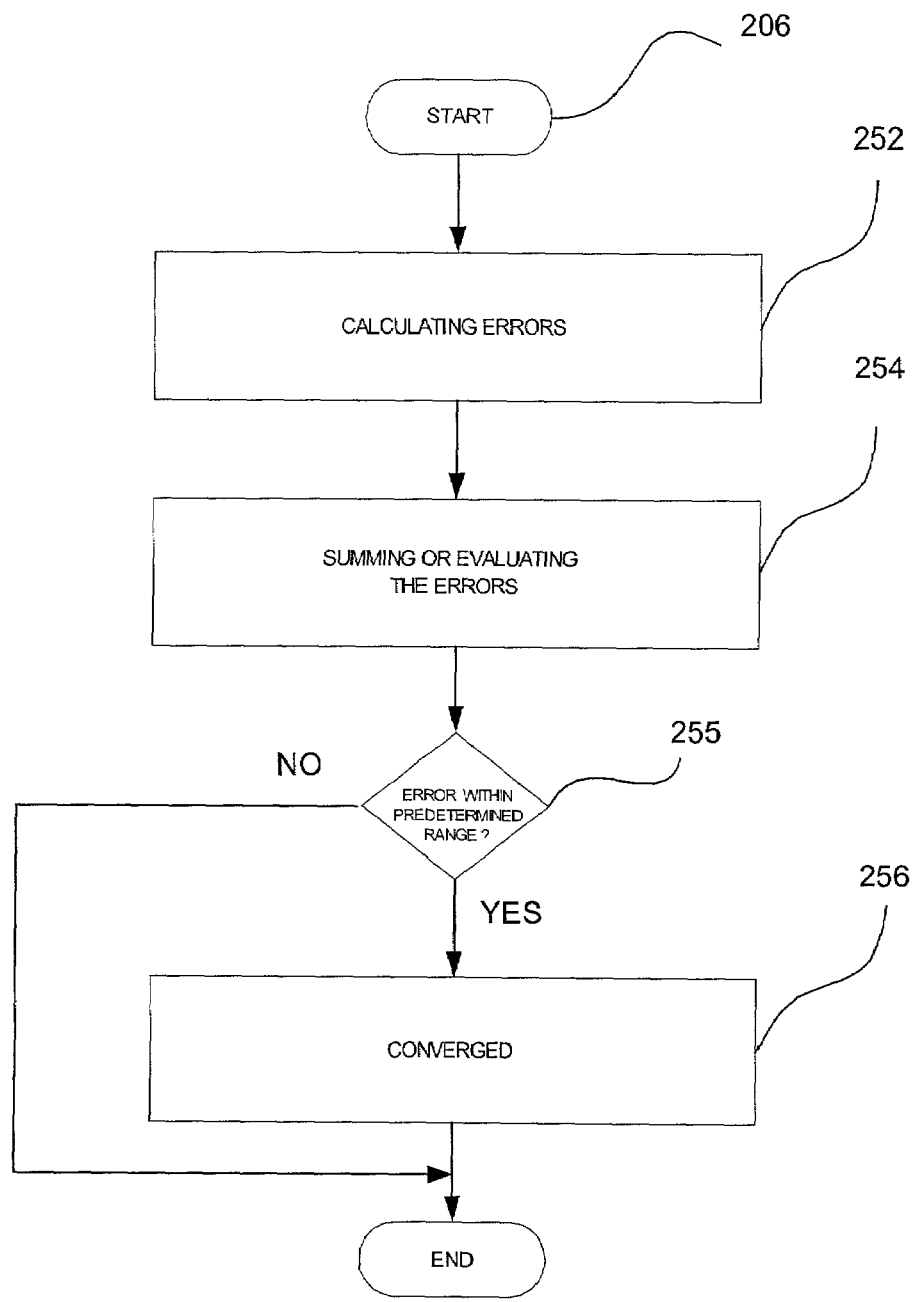
FIG. 2B illustrates a method for determining whether a solution has converged, in accordance with decision 206 of FIG. 2A.

FIG. 2B illustrates a method for determining whether a solution has converged, in accordance with decision 206 of FIG. 2A. While one particular method is being set forth herein for determining whether the solution converged, any particular method may be employed per the desires of the user.

Initially, a plurality of errors are calculated in operation 252 after which they are summed in operation 254. If the sum of errors is less than a predetermined amount per decision 255, it is concluded in operation 256 that the solution has converged. More information relating to such error calculation will be set forth hereinafter during reference to FIG. 8.

Figure 3:
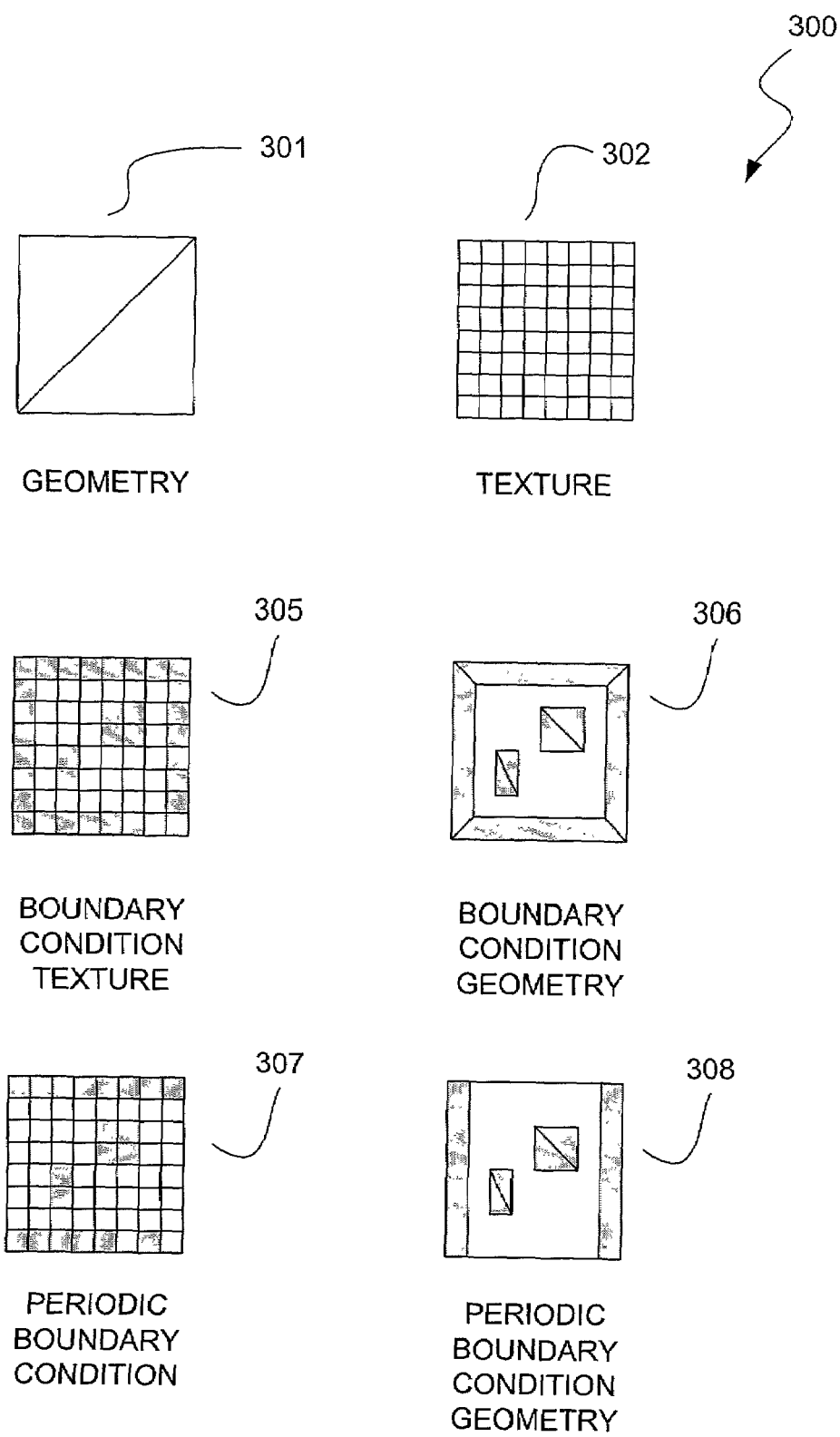
FIG. 3 shows the basic components used in calculating partial differential equation solutions in a hardware graphics pipeline.

FIG. 3 illustrates basic computer graphics elements 300 which may be employed when solving partial differential equations while rendering in a hardware graphics pipeline, in accordance with operation 202 of FIG. 2A. As shown, geometry 301, generally a simple object to cover all pixels of a render target surface, is used to initiate processing of texture elements 302 which contain the state of the solution as the method progresses. This geometry 301 may include, but is not limited to polygons, points, lines, and vertex data with position, texture, color, etc.

One or more texture maps may hold the boundary conditions and values 305, 307 which govern the solution of the partial differential equations. Boundary conditions and values may also be represented by geometry 306, 308 of various shape and size. Both periodic and non-periodic boundary conditions may be thus supplied, and the texture wrapping mode (whether textures are tiled continuously, clamped to border values, mirrored, etc.) may determine the nature of the boundary conditions. For example, as illustrated by boundary values 307, a texture may enforce boundary values along the upper and lower edges and not enforce boundary values along the left and right edges. Combined with horizontal texture tiling, this may give rise to a boundary condition periodic in the horizontal axis and non-periodic in the vertical axis.

Figure 4:
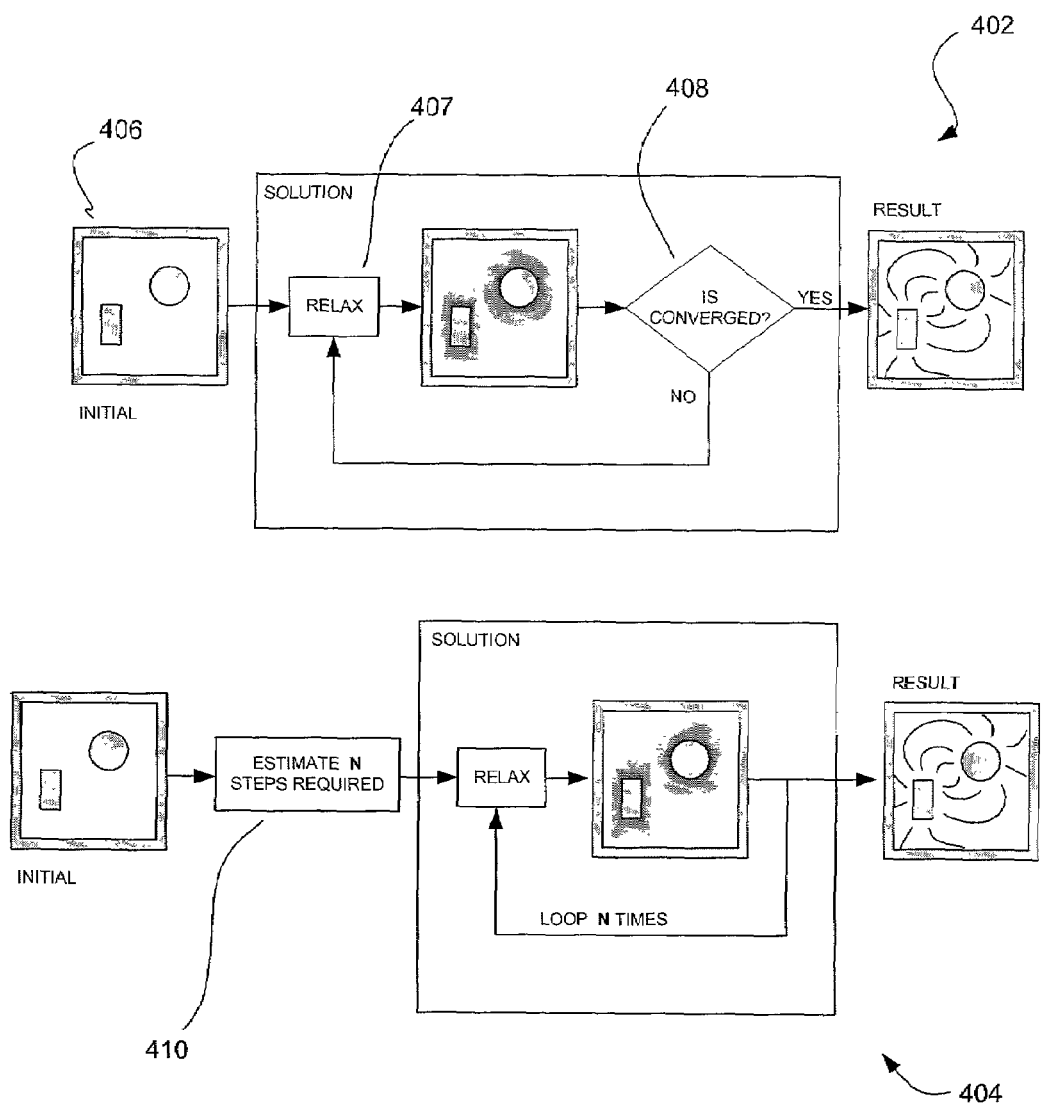
FIG. 4 presents the steps for a brute force solution using the relaxation method.

FIG. 4 illustrates two variations 402, 404 of a brute force relaxation operation for generating the solution of a partial differential equation, in accordance with operation 204 of FIG. 2A.

As shown in the first variation 402, the partial differential equation is initially discretized to a uniform grid 406 of a given mesh size. Further, a relaxation operation is performed in operation 407. Such technique is well known to those of ordinary skill. For example, an abstract description and derivation of these methods out of the present context may be found with reference to: Press, William H., Teukolsky, Saul A., et. al., "Numerical Recipes in C $2^{nd}$. Ed.", Cambridge University Press, 1992, which is incorporated herein by reference in its entirety. Finally, the solution may be evaluated for convergence in operation 408 after each or a number of relaxation steps.

In the alternate variation 404, a calculation or estimate 410 of the number of relaxation steps, n, required for convergence may be carried out before relaxation begins. The relaxation operation steps may then be carried out n times to achieve a solution, which may also be evaluated for convergence.

Figure 5A:
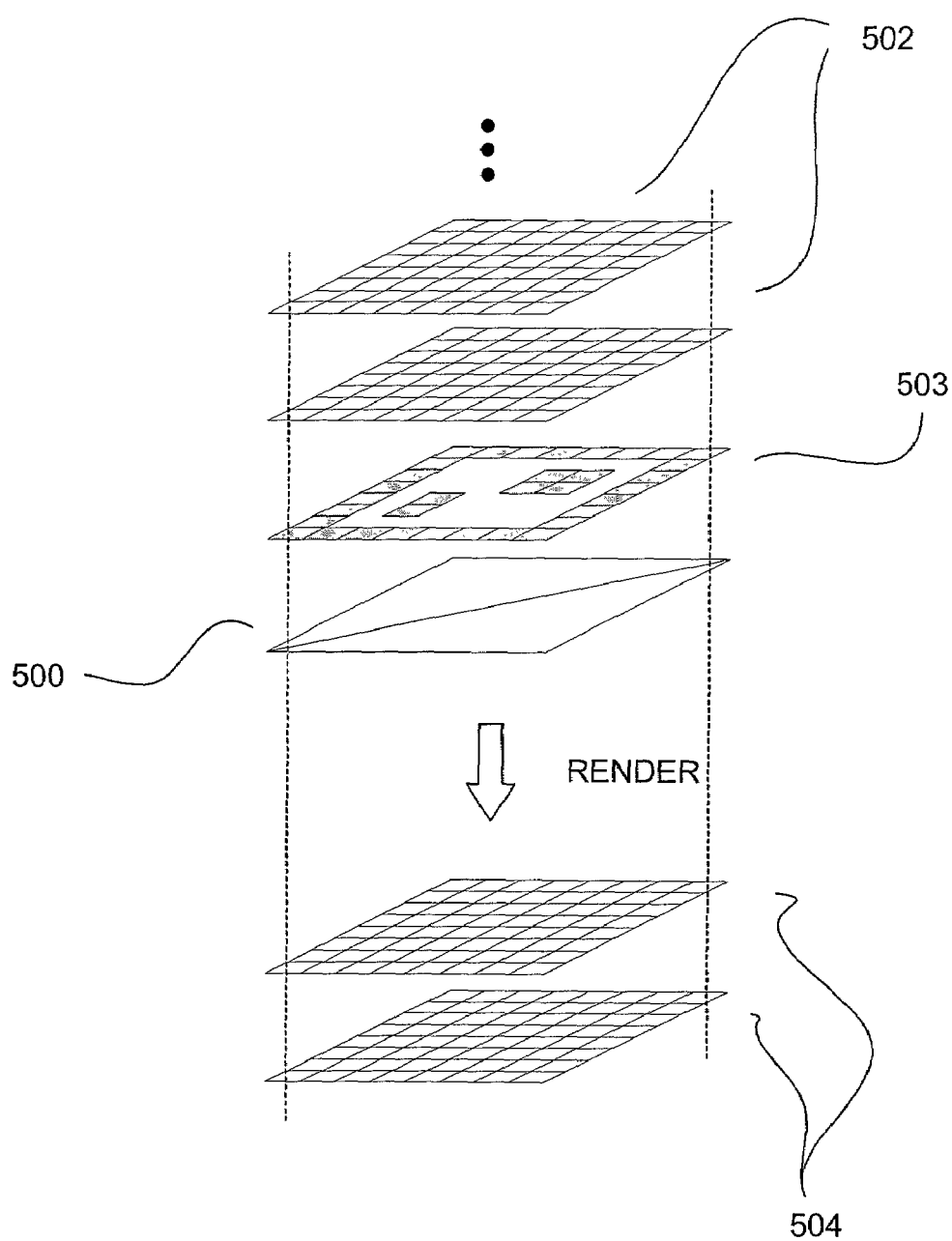
FIG. 5A demonstrates the combination of texture and geometry data in rendering one step of the solution.

FIG. 5A illustrates the use of geometry 500 in rendering a collection of input stored in textures 502, 503 to destination render targets 504, in accordance with operation 204 of FIG. 2A. In one embodiment, the present technique may establish a one-to-one correspondence between texels of a source textures 502 to pixels of the render targets 504, such that when the geometry 500 is rendered, an exact copies of the source textures 502 are rendered into the render targets 504.

Expanding on this approach in an unillustrated alternate embodiment, several textures 502 may be input and, in the process of rendering, their samples may be processed in various ways as described below. In such embodiment, texture coordinates may be used to determine which samples of the source textures 502 are supplied to a shading unit during rendering. By expressing these texture coordinates as offsets from a one-to-one mapping, a local area of texels may be supplied surrounding each pixel. In this way, it may be specified that each pixel rendered samples a given pattern of neighbors from the source textures 502. For example, each pixel may be supplied with its four nearest neighbors or any other pattern and number of neighbors. More information on such neighbor sampling will now be set forth in greater detail.

FIG. 5B depicts the steps involved in the configuration 5200 of the hardware graphics pipeline for neighbor sampling. Texture and shader data is bound to the pipeline in step 5201. Sampling the required basis values is specified 5202, as well as the method 5203 by which the basis values are to be processed to yield vectors. In the context of the present description, the samples from which data is derived are referred to as basis values. The pipeline is also directed in operation 5204 to output data to one or more render targets.

FIG. 5C depicts the steps carried out by the graphics pipeline in the act of rendering according to the configuration 5200 established previously. It also depicts an optional feedback loop 5310 whereby calculated values may be used to control additional sampling of basis values. This rendering writes visible pixels to a frame buffer as in operation 5304 and/or writes data to a texture or other render target as in operation 5305. FIG. 5D depicts the basic rendering loop in which the hardware graphics pipeline is configured and rendering progresses. Each circuit through this loop may render all or part of a scene including intermediate steps not visible in the final rendered image.

More information regarding such neighbor sampling may be found with reference to an application filed coincidently herewith naming inventors Greg Edward James and Matthias Wloka under the title: "SYSTEM AND METHOD FOR CREATING A VECTOR MAP IN A HARDWARE GRAPHICS PIPELNE" and application Ser. No. 10/099,770, which is incorporated herein by reference in its entirety.

Figure 6:
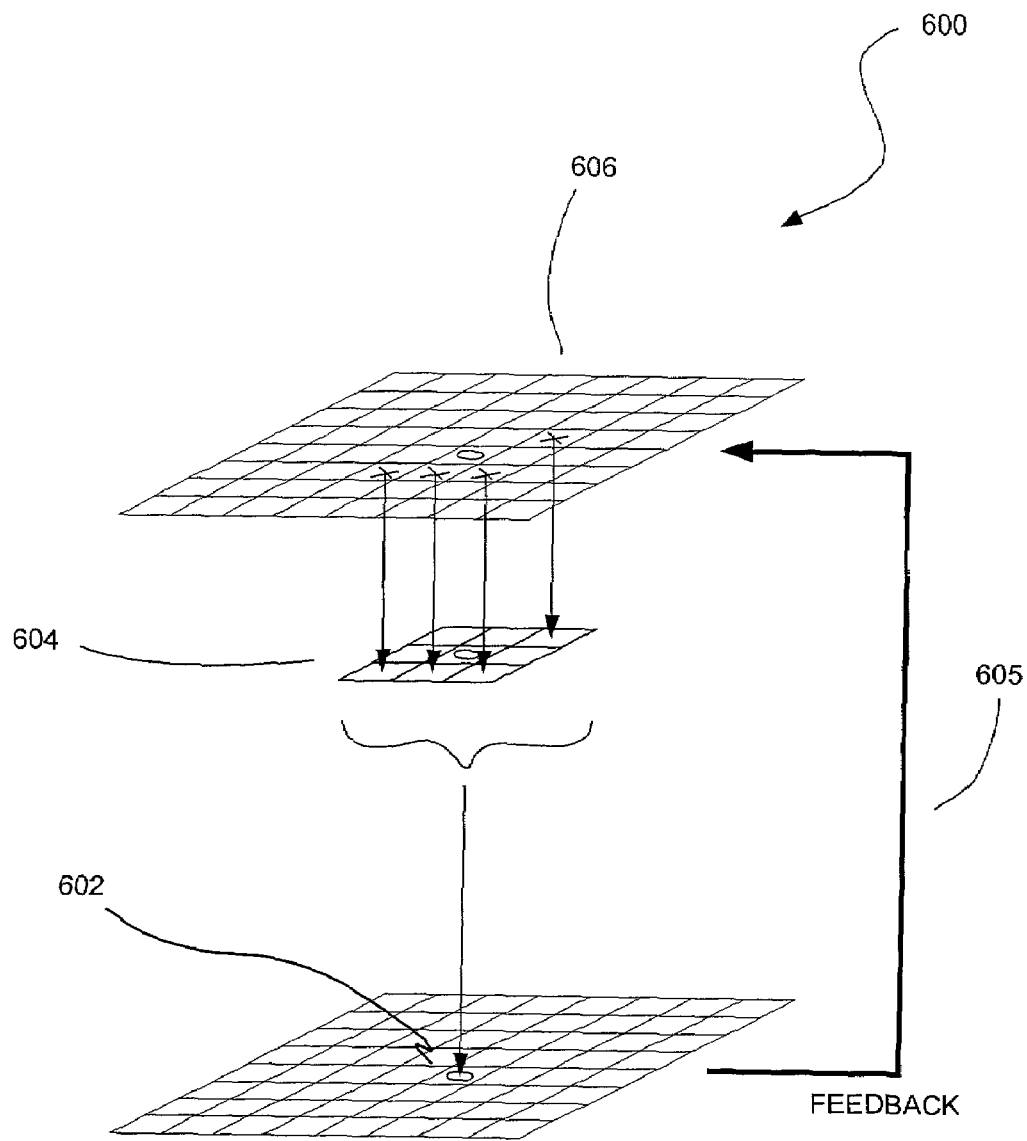
FIG. 6 illustrates the sampling and processing for a rendered pixel during one step of the solution.

FIG. 6 illustrates the calculation 600 of one pixel grid value in the solution during one step of a relaxation operation as carried out in a hardware graphics pipeline, in accordance with operation 204 of FIG. 2A or more specifically operation 407 of FIG. 4. The underlying geometry has been omitted from this diagram and subsequent diagrams for clarity purposes.

As shown in FIG. 6, each rendered pixel 602 samples a local area 604 of texels 606. This local area 604 is processed according to a relaxation operation to yield a 'relaxed' value which is written to the destination. The nature of the relaxation operation may be governed by the formulation of the partial differential equation being solved. A specific example of this will be given hereinafter. Carried out for every pixel of the discrete grid representing the state of the equation, the calculation 600 of FIG. 6 constitutes one relaxation step 407 as shown in FIG. 4. By carrying out many of these relaxation operations, supplying each relaxed grid as input to the subsequent relaxation step via the feedback 605, the grid of values may converge to the solution of the partial differential equation.

Figure 7A:
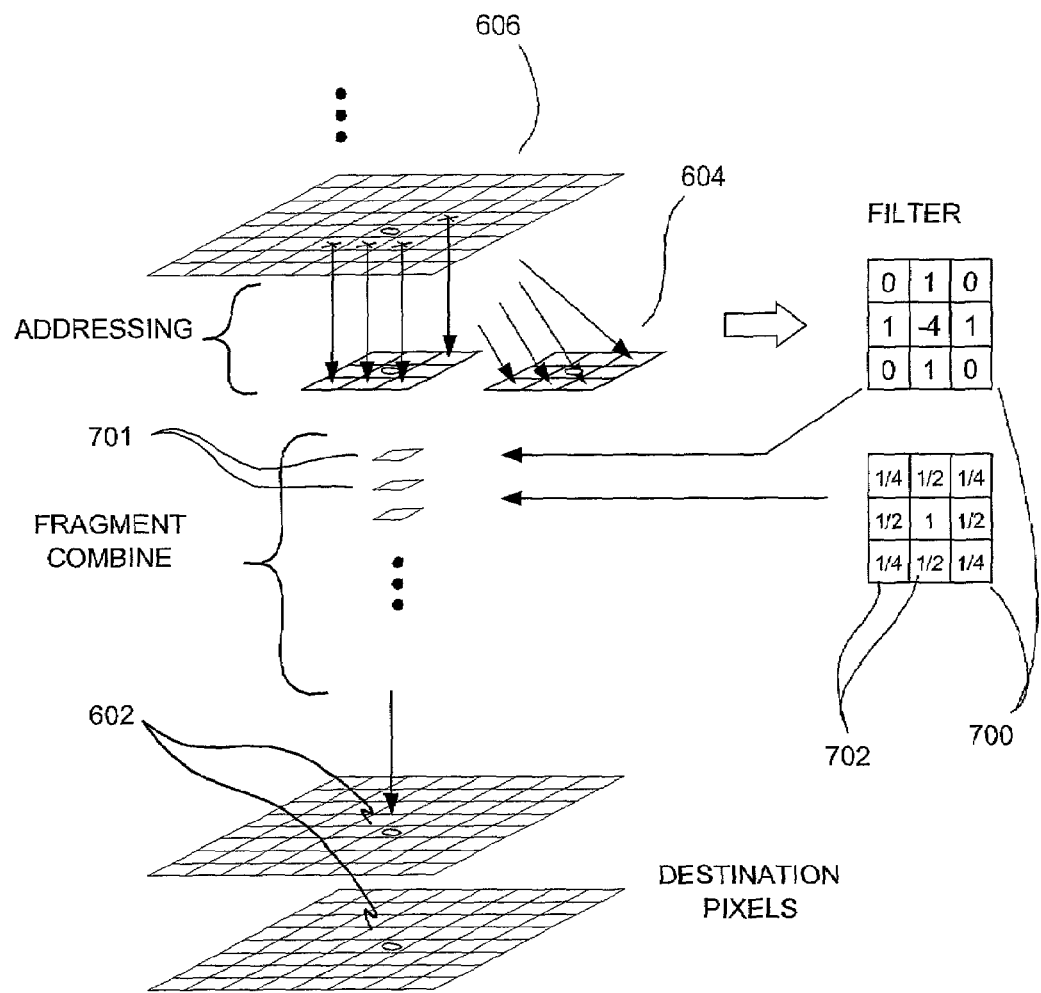
FIG. 7A further illustrates the sampling and processing for a rendered pixel.

FIG. 7A elaborates on the sampling of FIG. 6 to show various convolution kernels or filters 700 that may be applied to the local area 604 of samples in generating various intermediate fragment values 701. Such fragment values are processed to yield various pixel values 602. As shown, programmable or non-programmable filters 700 including one or more elements 702 may be used. In one embodiment, three elements by three elements (3×3) may be used. In practice, such filters 700 may contain any number of elements 702, and a plurality of filters 700 may be employed in the rendering.

Figure 7B:
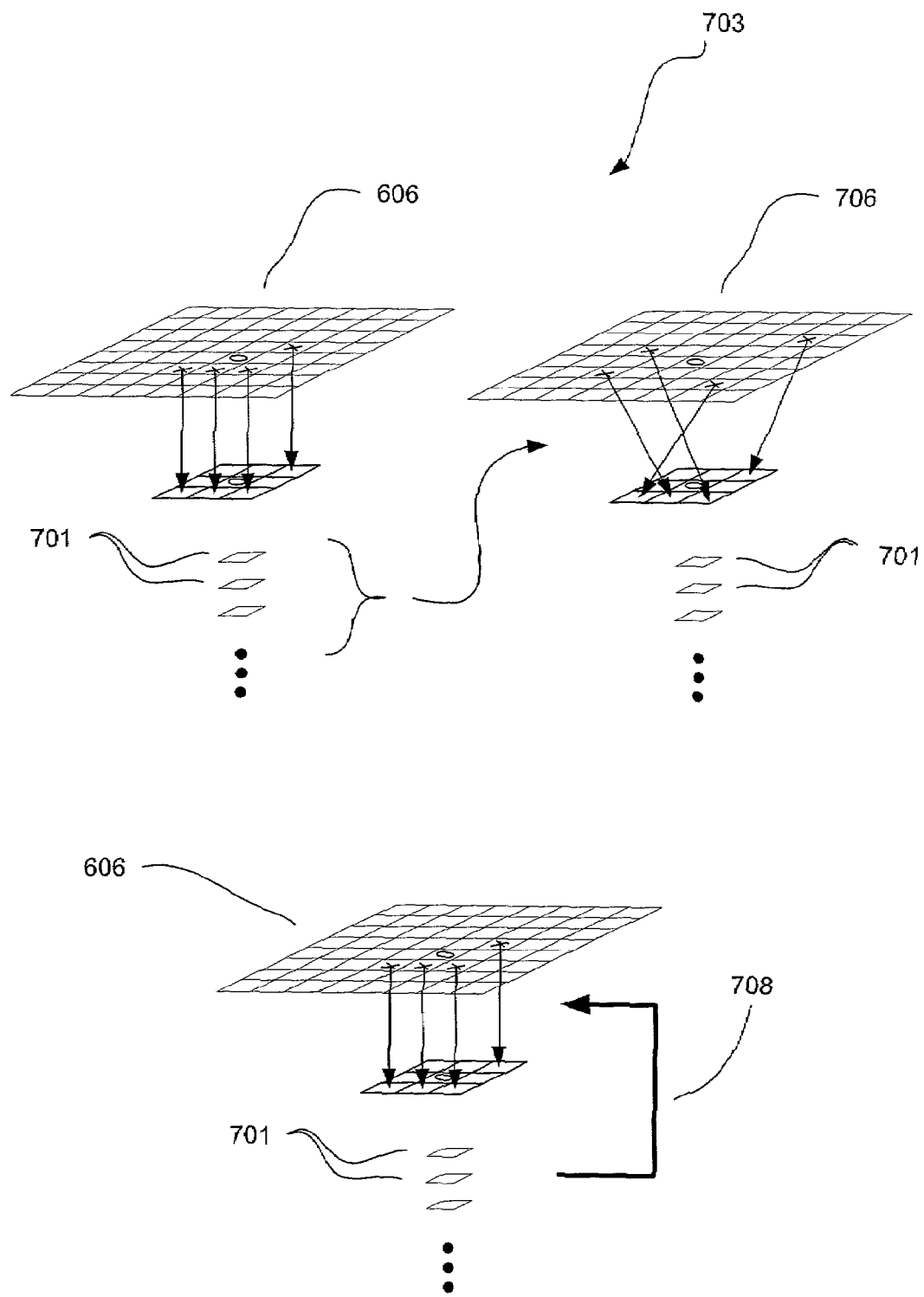
FIG. 7B illustrates a technique by which initial samples may control the addresses from which subsequent samples are taken

FIG. 7B illustrates a technique 703 by which intermediate values 701 as computed in FIG. 7A may also affect the coordinates at which subsequent values 706 are sampled. Any intermediate values 701 or combinations thereof may then be used to determine the coordinates of sampling via feedback 708. Such a feedback mechanism may be useful in varying the pattern of sampling from one relaxation operation to the next. Such variation may reduce the number of relaxation steps required, and provides a basis in the context of a hardware graphics pipeline for the mathematical red/black checkerboard technique of relaxation. Abstract information on such technique may be found out of this context in the aforementioned reference [Press].

Figure 8:
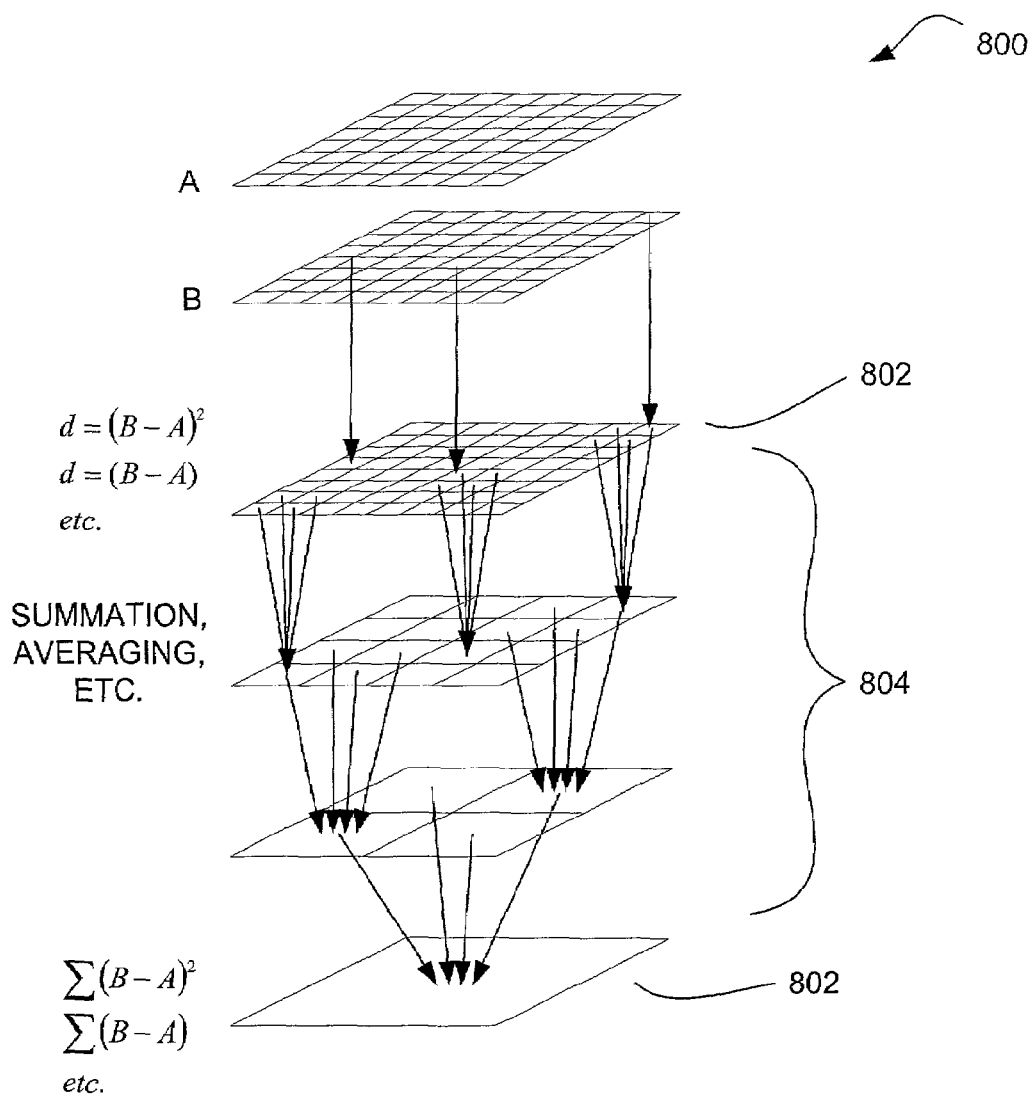
FIG. 8 illustrates a method for the calculation and summation of residuals or errors via rendering operations.

FIG. 8 illustrates a technique 800 by which errors 802 (i.e. residuals) may be calculated and summed, averaged, or otherwise reduced to a smaller set of error values over subsequent rendering operations in a hardware graphics pipeline, in accordance with the various operations of FIG. 2B. As set forth earlier, such evaluation of errors 802 and reduction 804 may be used in determining the convergence and accuracy of a solution and may be employed at any time for such purpose.

This technique may be carried out in a manner similar to the well known method of creating texture mipmaps in a hardware graphics pipeline. The creation of mipmaps involves an average of local areas, however, a sum or more advanced calculation may be performed in the reduction to yield a single error metric.

Possibly, such an accumulation of errors may only be meaningful if carried out with floating point texture fragment values, though any numerical format may be employed in the hardware graphics pipeline. Also, the sum may be carried out over multiple rendering passes. With sufficiently adaptable hardware, it may be carried out in a single rendering pass from the finest detail level to the single value.

Figure 9:
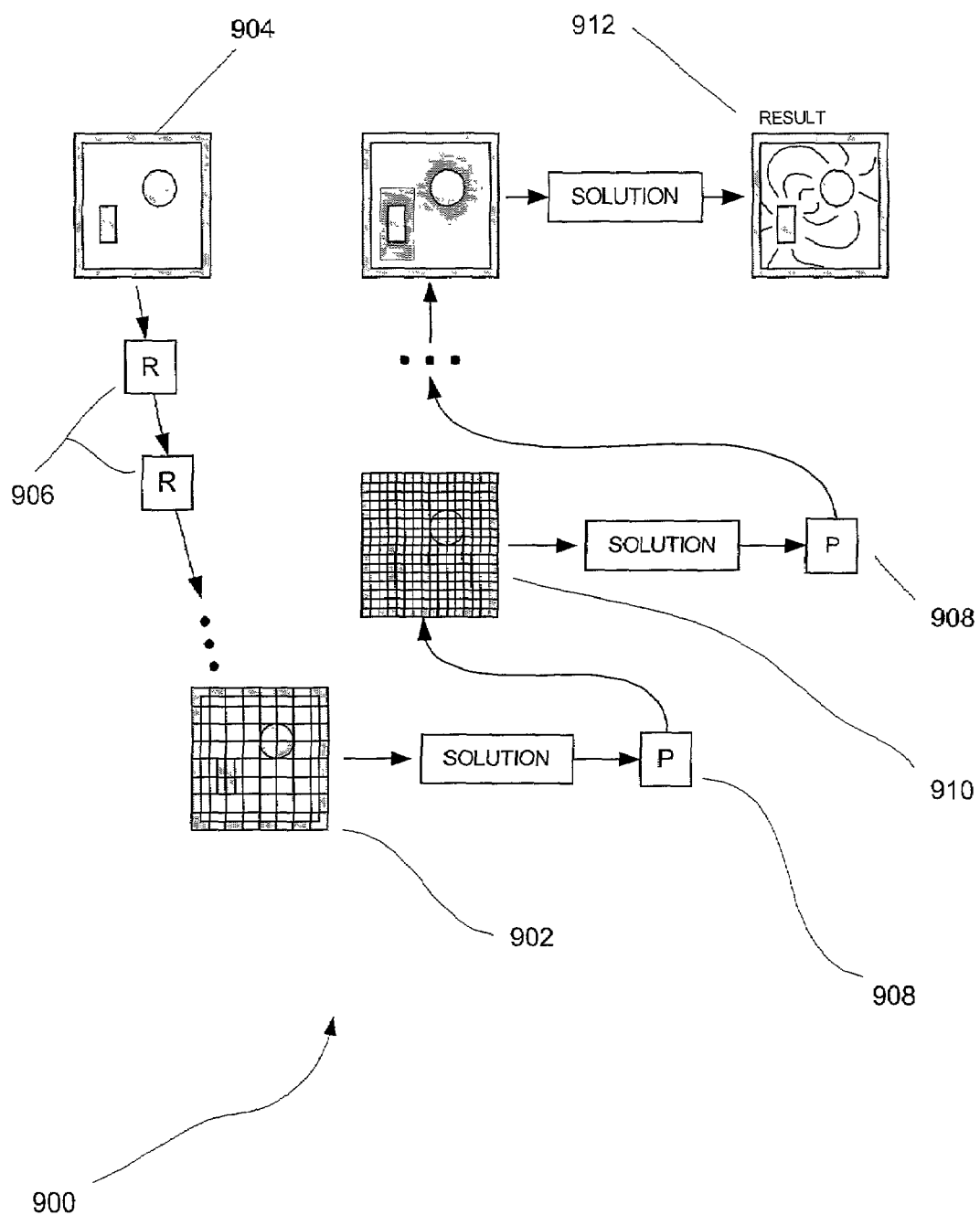
FIG. 9 illustrates a technique for the implementation of a multi-grid relaxation method solution in a hardware graphics pipeline.

FIG. 9 shows an advanced multi-grid relaxation method 900, in accordance with one embodiment. Abstract multi-grid relaxation approaches are well known and described generically out of the present context in: Press, William H., Teukolsky, Saul A., et. al., "Numerical Recipes in C $2^{nd}$. Ed.", Cambridge University Press, 1992. One advantage of the present method 900 is its ability to converge much more rapidly than the brute force Jacobi methods of FIG. 4, where a great deal of iterative relaxation steps are required to reach a solution.

With such an approach, the solution of the partial differential equation begins at a coarse grid 902 provided by a few number of iterations of a restriction operation 906 involving an initial grid 904 of fine resolution. The discretized equation is solved on this coarse grid, as this solution may be achieved with far fewer relaxation steps than required for the fine grid. The solution may be achieved in such a way by the methods of FIG. 4. Solution values of this coarse grid 902 are then propagated via a prolongation operation 908 to generate a first finer grid 910. The propagated values of the first finer grid 910 are not an accurate solution over the fine grid, but provide an initial distribution which typically converges to a solution after only a few more relaxation operations.

The first finer grid 910 is, in turn, solved and propagated via prolongation 908 until the desired fineness of solution 912 is achieved. By such method of working from coarse to fine grids, a solution may be found for the fine grid using far fewer relaxation operations than are required if working only with the fine grid. Many well known configurations of restriction, coarse solution, and subsequent prolongation exist and may be found out of the present context with reference to: Press, William H., Teukolsky, Saul A., et. al., "Numerical Recipes in C $2^{nd}$. Ed.", Cambridge University Press, 1992.

FIG. 9 shows an exemplary single-ascent to the solution at fine resolution. More elaborate V-cycle and W-cycle schemes of increasing and decreasing resolution over subsequent steps are commonplace in the prior art out of the present context, and may also be implemented in a hardware graphics pipeline per the methods of the present embodiment.

Figure 10:
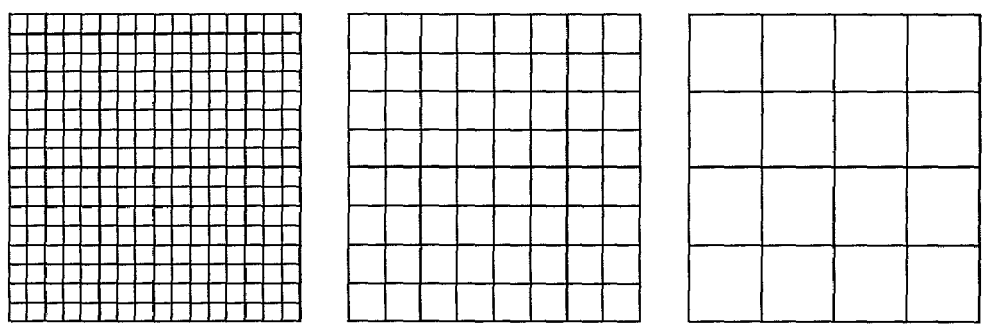
FIG. 10 illustrates a few grids of various resolutions as may be used in a multi-grid approach.
Figure 11:
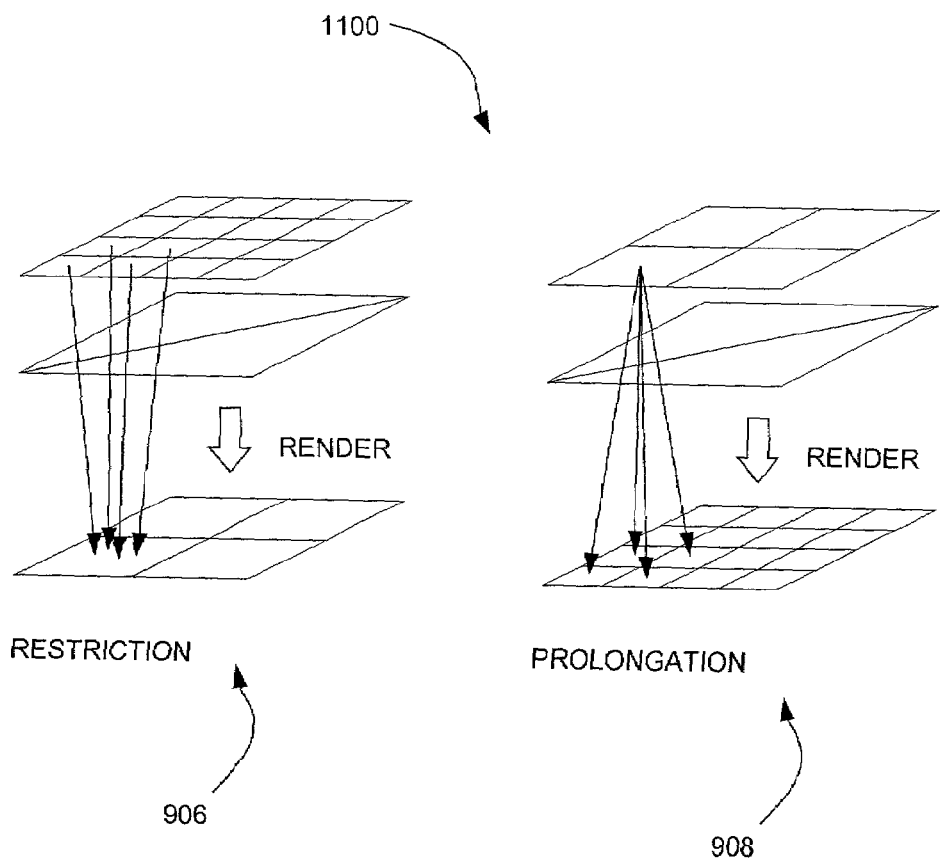
FIG. 11 illustrates a simple sampling pattern for prolongation and restriction as implemented in a hardware graphics pipeline.

FIG. 10 illustrates a few grids 1000 of various resolution on which the multi-grid methods may be performed. By the method of one embodiment, the grids may exist as textures within the hardware graphics pipeline. FIG. 11 illustrates simple sampling patterns 1100 for the prolongation operation 908 and restriction operation 906 as implemented in a hardware graphics pipeline, in accordance with the method of FIG. 9. As with the filtering of FIG. 7A, the prolongation and restriction operations may employ filters of any size.

The solution to partial differential equations can be used to generate 3D graphics images, utilizing the same hardware graphics pipeline that is used to find the solution to the partial differential equations. Hence, the hardware graphics pipeline can be time-shared between solving equations and rendering images.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A hardware graphics pipeline-implemented method for generating a solution to a partial differential equation in a hardware graphics pipeline, comprising:

receiving input in the hardware graphics pipeline;

processing the input to generate the solution to the partial differential equation utilizing the hardware graphics pipeline; and generating output utilizing the hardware graphics pipeline for display;

wherein the solution to the partial differential equation is generated utilizing the hardware graphics pipeline for enhancing graphics processing operations performed by the hardware graphics pipeline;

wherein the graphics processing operations performed by the hardware graphics pipeline are enhanced by determining a location of surfaces or objects for rendering purposes utilizing the solution to the partial differential equation generated utilizing the hardware graphics pipeline;

wherein the input includes a local area of textures used to sample a texture map to generate a modified local area of textures;

wherein the processing further includes determining whether the solution has converged;

wherein the determining whether the solution has converged includes calculating errors and concluding that the solution has converged based on the calculation of the errors;

wherein the determining whether the solution has converged further includes summing the errors, and concluding that the solution has conversed if the sum of errors is less than a predetermined amount.

2. The method as set forth in claim 1, wherein the input represents boundary conditions.

3. The method as set forth in claim 1, wherein the input includes geometry.

4. The method as set forth in claim 3, wherein the geometry is selected from the group consisting of polygons, vertex data, points, and lines.

5. The method as set forth in claim 1, wherein the local area of textures is generated by sampling the texture map.

6. The method as set forth in claim 1, wherein the local area of textures is filtered.

7. The method as set forth in claim 6, wherein the filtering is carried out using a programmable filter.

8. The method as set forth in claim 6, wherein the filtering is carried out using a non-programmable filter.

9. The method as set forth in claim 1, wherein the local area of textures is filtered utilizing a plurality of filters.

10. The method as set forth in claim 1, wherein the processing includes a relaxation operation.

11. The method as set forth in claim 10, wherein the relaxation operation is selected based on the partial differential equation.

12. The method as set forth in claim 10, wherein the processing includes a plurality of iterations of the relaxation operation.

13. The method as set forth in claim 12, wherein a number of the iterations of the relaxation operation is reduced using at least one of a prolongation operation and a restriction operation.

14. The method as set forth in claim 13, wherein the restriction operation includes mapping and filtering a plurality of grid values onto a grid of lower resolution and the prolongation operation includes mapping and filtering the plurality of grid values onto a grid of higher resolution.

15. The method as set forth in claim 12, wherein the number of iterations of the relaxation operation is determined prior to the processing.

16. The method as set forth in claim 10, wherein it is determined whether the solution has converged after each iteration of the relaxation operation.

17. The method as set forth in claim 10, wherein it is determined whether the solution has converged after a predetermined number of multiple iterations of the relaxation operation.

18. The method as set forth in claim 1, wherein the determining whether the solution has converged further includes concluding that the solution has converged if an error is less than the predetermined amount.

19. The method as set forth in claim 1, wherein if it is determined that the solution has converged, repeating the processing using an altered parameter value.

20. The method as set forth in claim 1, wherein the sum of errors is carried out in floating point texture fragment values over at least one rendering operation utilizing at least one rendering pass of the hardware graphics pipeline.

21. A hardware graphics pipeline-implemented method for generating a solution to a partial differential equation in a hardware graphics pipeline, comprising:
   receiving input in the hardware graphics pipeline;
   processing the input to generate the solution to the partial differential equation utilizing the hardware graphics pipeline; and
   generating output utilizing the hardware graphics pipeline for display;
   wherein the solution to the partial differential equation is generated utilizing the hardware graphics pipeline for enhancing graphics processing operations performed by the hardware graphics pipeline;
   wherein the input includes a local area of textures;
   wherein the local area of textures is filtered utilizing a filter including a plurality of elements;
   wherein the local area of textures is used to sample a texture map to generate a modified local area of textures;
   wherein the processing further includes determining whether the solution has converged;
   wherein the determining whether the solution has converged includes calculating errors and concluding that the solution has converged based on the calculation of the errors;
   wherein the determining whether the solution has converged further includes summing the errors, and concluding that the solution has conversed if the sum of errors is less than a predetermined amount.

22. A hardware graphics pipeline-implemented method for generating a solution to a partial differential equation in a hardware graphics pipeline, comprising:
   receiving input in the hardware graphics pipeline;
   processing the input to generate the solution to the partial differential equation utilizing the hardware graphics pipeline; and
   generating output utilizing the hardware graphics pipeline for display;
   wherein the solution to the partial differential equation is generated utilizing the hardware graphics pipeline for enhancing graphics processing operations performed by the hardware graphics pipeline;
   wherein the input includes a local area of textures;
   wherein the local area of textures is used to sample a texture map to generate a modified local area of textures;
   wherein the processing further includes determining whether the solution has converged;
   wherein the determining whether the solution has converged includes calculating errors and concluding that the solution has converged based on the calculation of the errors;
   wherein the determining whether the solution has converged further includes summing the errors, and concluding that the solution has conversed if the sum of errors is less than a predetermined amount.

23. A system comprising:
   a hardware graphics pipeline processing input to generate a solution to partial differential equations;
   wherein the solution to the partial differential equations is generated utilizing the hardware graphics pipeline for enhancing graphics processing operation performed by the hardware graphics pipeline;
   wherein the graphics processing operation performed by the hardware graphics pipeline is enhanced by determining a location of surfaces or objects for rendering purposes utilizing the solution to the partial differential equation generated utilizing the hardware graphics pipeline;
   wherein the input includes a local area of textures used to sample a texture map to generate a modified local area of textures;
   wherein the processing further includes determining whether the solution has converged;
   wherein the determining whether the solution has converged includes calculating errors and concluding that the solution has converged based on the calculation of the errors;
   wherein the determining whether the solution has converged further includes summing the errors, and concluding that the solution has conversed if the sum of errors is less than a predetermined amount.

24. A system, comprising:
   means for receiving input in a hardware graphics pipeline; and
   means for processing the input to generate a solution to a partial differential equation utilizing the hardware graphics pipeline;
   wherein the solution to the partial differential equation is generated utilizing the hardware graphics pipeline for enhancing graphics processing operations performed by the hardware graphics pipeline;
   wherein the graphics processing operations performed by the hardware graphics pipeline are enhanced by determining a location of surfaces or objects for rendering purposes utilizing the solution to the partial differential equation generated utilizing the hardware graphics pipeline;
   wherein the input includes a local area of textures used to sample a texture map to generate a modified local area of textures;
   wherein the processing further includes determining whether the solution has converged;
   wherein the determining whether the solution has converged includes calculating errors and concluding that the solution has converged based on the calculation of the errors;
   wherein the determining whether the solution has converged further includes summing the errors, and concluding that the solution has conversed if the sum of errors is less than a predetermined amount.

25. A hardware graphics pipeline-implemented method for computing a solution to partial differential equations in a hardware graphics pipeline, comprising:
   receiving boundary conditions;
   computing the solution to the partial differential equations utilizing a relaxation operation involving the boundary conditions, at least some of the computing done in the hardware graphics pipeline;
   determining whether the solution has converged;
   if the solution has not converged, repeating the computing and the determining; and
   generating output utilizing the hardware graphics pipeline for display;
   wherein the solution to the partial differential equations is generated utilizing the hardware graphics pipeline for enhancing graphics processing operations performed by the hardware graphics pipeline;

wherein the graphics processing operations performed by the hardware graphics pipeline are enhanced by determining a location of surfaces or objects for rendering purposes utilizing the solution to the partial differential equation generated utilizing the hardware graphics pipeline;

wherein input to the hardware graphics pipeline includes a local area of textures used to sample a texture map to generate a modified local area of textures;

wherein the determining whether the solution has converged includes calculating errors and concluding that the solution has converged based on the calculation of the errors;

wherein the determining whether the solution has converged further includes summing the errors, and concluding that the solution has converged if the sum of errors is less than a predetermined amount.

26. A hardware graphics pipeline-implemented method for computing a solution to a partial differential equation in a hardware graphics pipeline, comprising:

receiving boundary conditions in the form of at least one of geometry and textures;

computing the solution to the partial differential equation utilizing a relaxation operation involving the boundary conditions, at least some of the computing done in the hardware graphics pipeline;

determining whether the solution has converged by:
calculating errors,
summing the errors, and
concluding that the solution has converged if the sum of errors is less than a predetermined amount;

if the solution has not converged, repeating the computing and determining;

if the solution has converged, incrementing a time value;

repeating the foregoing operations using the incremented time value; and generating output utilizing the hardware graphics pipeline for display;

wherein the solution to the partial differential equation is generated utilizing the hardware graphics pipeline for enhancing graphics processing operations performed by the hardware graphics pipeline;

wherein the graphics processing operations performed by the hardware graphics pipeline are enhanced by determining a location of surfaces or objects for rendering purposes utilizing the solution to the partial differential equation generated utilizing the hardware graphics pipeline;

wherein input to the hardware graphics pipeline includes a local area of textures used to sample a texture map to generate a modified local area of textures.

27. A hardware graphics pipeline-implemented method for generating a 3-D graphics image, comprising:

receiving a first input into a hardware graphics pipeline;

processing the first input to generate a solution to a partial differential equation utilizing the hardware graphics pipeline;

receiving a second input into the hardware graphics pipeline;

rendering the 3D graphics image utilizing the hardware graphics pipeline for display, wherein the rendering utilizes the second input and the result of the processing of the first input;

wherein the solution to the partial differential equation is generated utilizing the hardware graphics pipeline for enhancing graphics processing operations performed by the hardware graphics pipeline;

wherein the graphics processing operations performed by the hardware graphics pipeline are enhanced by determining a location of surfaces or objects for rendering purposes utilizing the solution to the partial differential equation generated utilizing the hardware graphics pipeline;

wherein at least one of the first input and the second input includes a local area of textures used to sample a texture map to generate a modified local area of textures;

wherein the processing further includes determining whether the solution has converged;

wherein the determining whether the solution has converged includes calculating errors and concluding that the solution has converged based on the calculation of the errors;

wherein the determining whether the solution has converged further includes summing the errors, and concluding that the solution has converged if the sum of errors is less than a predetermined amount.

28. The method as set forth in claim 27, wherein:
the first input comprises boundary conditions; and
the processing comprises:
computing the solution to the partial differential equation utilizing a relaxation operation involving the boundary conditions;
the determining whether the solution has converged; and
if the solution has not converged, repeating the computing and determining.

* * * * *